Nov. 24, 1931.  E. L. BUXTON  1,833,204

KEYBOARD AND STAFF READER

Filed Oct. 24, 1929

INVENTOR
Ethel Lee Buxton
BY
ATTORNEY

UNITED STATES PATENT OFFICE

ETHEL LEE BUXTON, OF KANSAS CITY, MISSOURI

KEYBOARD AND STAFF READER

Application filed October 24, 1929. Serial No. 402,246.

My invention relates to keyboard and staff readers for primary students of musical instruments, and has for its principal objects to facilitate learning of the relationship between a keyboard and a staff, to afford tactual as well as visual guidance for ascertaining said relationship, to emphasize the distinctions between sets of keys and a plurality of staffs, and to simplify the construction and operation of keyboard and staff readers.

In accomplishing these and other objects of the invention, I have provided improved details of structure, the preferred forms of which are illustrated in the accompanying drawings, wherein.

Figure 1:
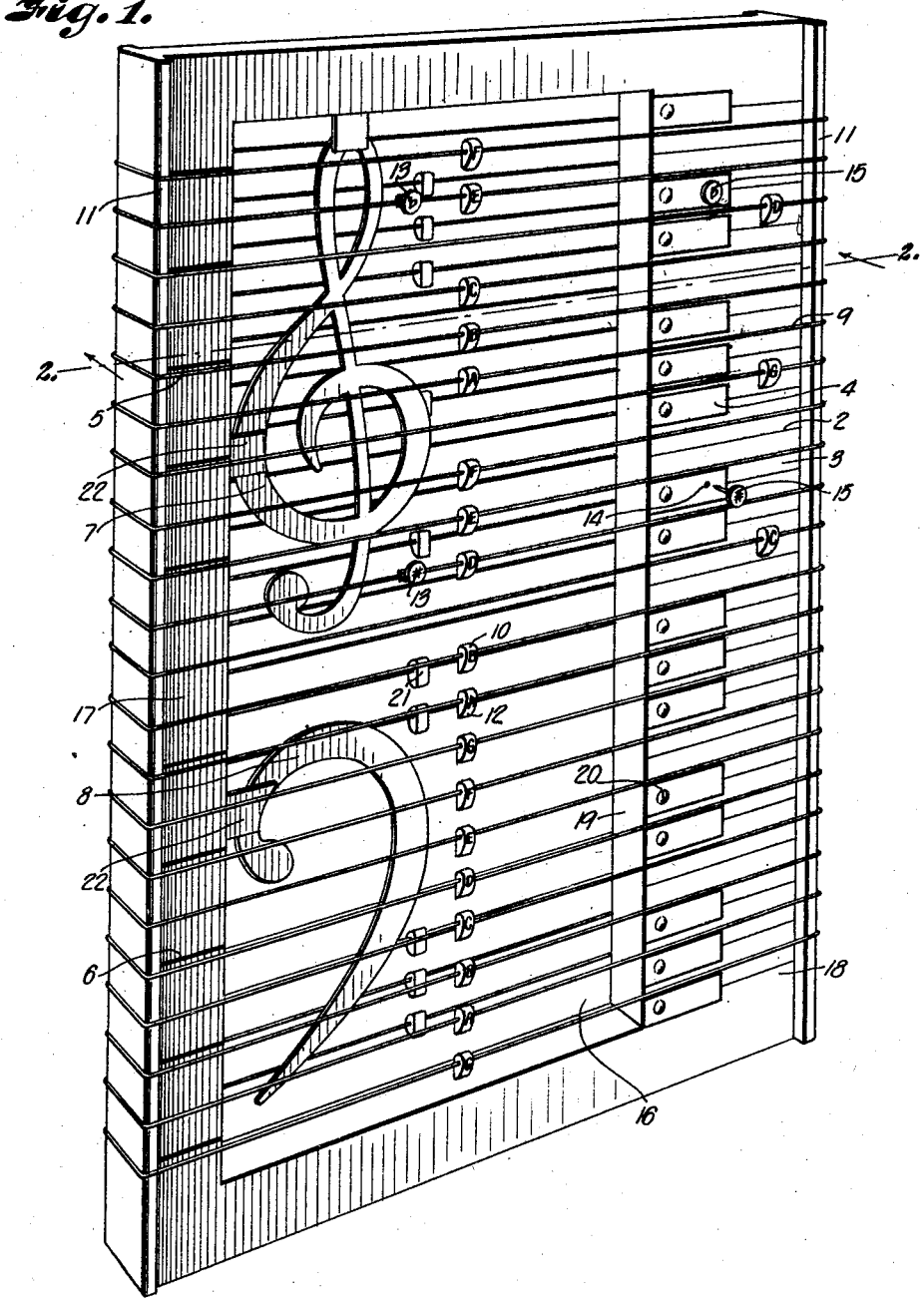
Fig. 1 is a perspective view of a keyboard and staff reader embodying my invention.
Figure 2:
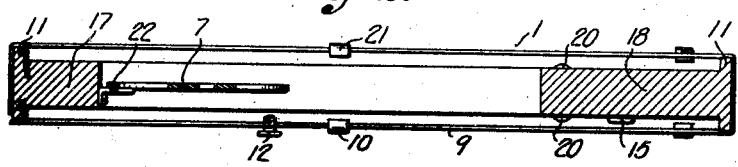
Fig. 2 is a cross section on the line 2—2, Fig. 1.

Referring in detail to the drawings:

1 designates a support or frame preferably comprising a board having a representation of a keyboard at one edge formed by transverse lines 2 defining spaces 3 representing white keys of a piano keyboard, and rectangular insets 4 in said spaces to represent black keys.

The frame is further provided with sets of lines 5 and 6 representing lines and defining spaces of musical staffs, and with indicia 7 and 8 comprising respectively the treble and base clef signs located in suitable positions with reference to the respective staffs.

The staffs are suitably related to the white keys so that a student selecting a degree or pitch, i. e. a line or space on the staff, may follow the extended degree and identify the key corresponding thereto, or may identify degrees corresponding to keys.

To facilitate identification of keys and note positions on the staffs, guides 9 are mounted on the frame in overlying relation with the positions of the lines and spaces of the staffs, for slidably supporting buttons 10 bearing letters indicating the several positions.

The guides extend outwardly from the face of the frame, for facilitating movement of the buttons therealong, and preferably comprise wires spaced from the keyboard by edge ribs or bridges 11 and suitably anchored to the frame to confer relative rigidity on the guides.

The two staffs are spaced as in a conventional musical score to afford an area to receive guides and buttons representing positions of added or leger lines and spaces or degrees, for pitches respectively below the treble clef and above the bass clef, and identifying corresponding keys on the keyboard.

The buttons 10 are preferably perforated and threaded on the wires. Means for assuring vertical position of the buttons to assure visibility of indicia on the faces thereof, and to effect location of the indicia-supporting portions of the buttons in proper relation with the degrees of the staffs, preferably comprises depending button portions 12 forming elongated weighted lower ends thereof.

Tabs 13 bearing sharp and flat key indicia are adapted to be mounted on the frame in suitable relation with the degrees to comprise a key-signature, and preferably comprise clips that may be mounted on the guides adjacent the clefs.

In order to indicate the sharped or flatted notes and black keys to be played in accordance with the key signature, the black keys are provided with sockets 14 to receive pins 15 bearing sharp and flat indicia.

The board is preferably cut out to define an opening 16, and form panels 17 and 18 respectively at the left and right hand sides of the frame in the illustrated application of the invention.

The right hand panel 18 bears the representation of the keyboard, the inner margin 19 thereof comprising the inner end margins of the white keys.

The inner ends of the black keys are set flush with said margin 19, and the rear end edges of the white keys, whereby the student positioning the frame with the panel 18 adjacent his person, will find the representation of the keyboard positioned normally and corresponding to the relative positions of black and white keys on a piano keyboard.

Bosses or pins 20 are mounted on the black keys at their inner ends, to form protuberant members for simulating the elevated character of black keys on a piano keyboard, and providing means for distinguishing said keys by the sense of touch.

The wires span the frame opening and the clef members preferably comprise cutouts or skeleton forms mounted on the wires.

In order to further enhance the suggestiveness of the association of staffs and degrees thereof with the keyboard, the treble clef and markers therefor are mounted in positions where they are readily available to the right hand of the user, and the bass clef and markers therefor are mounted for access by the left hand of the user. The student may position the frame horizontally, and extending forwardly with the panel 18 adjacent his person, whereby his right hand may have easy access to the treble staff features, and his left hand may have easy access to the bass staff features, for learning the relations between the pitch-indicating elements and the keys.

All of the wires may extend entirely around the frame and in any event the wire portions that support markers have outer terminal portions supported in spaced relation with the frame by bridges at the outer edges of the keyboard to facilitate movement of the members from retracted position adjacent the clefs over the panel 18 to positions where they indicate keys corresponding to degrees. The markers may frictionally engage the keyboard panel and be latched thereby in degree-indicating positions.

Due to the open character of the frame, and the visibility of the clef signs and guides through the opening, the device may be positioned vertically and operated as a harp. To facilitate the use of the device in vertical position, similar representations of the keyboard are preferably provided on both sides of the panel 18, and the bottoms are adapted to display their symbols in the desired position of the frame. When the frame is primarily intended for vertical positioning, the buttons will be weighted to show symbols on their sides. Additional sets of buttons 21 may be provided on the portions of guide wires extending on the opposite side of the frame from the front side in the figure. The clef signs are located between the sets of wires forming the double series of staffs, and supported by brackets 22, forming a harp-like device adapted to be held vertically with the clef edge of the frame adjacent the person, the treble staff thus being most accessible to the right hand and the bass clef to the left hand.

The student may position the frame horizontally with the keyboard so located that the black keys are inset from the front edges of the white keys, and the treble clef is at his right hand. When staff guides are visible and accessible from opposite sides of the frame, as in the open frame structure shown, the frame may be positioned vertically in a similar relation and the outer edge of the keyboard from the standpoint of the student will extend toward the clef signs.

The student may move the markers back and forth on the guides for identifying keyboard keys corresponding to staff degrees, or degrees corresponding to keys. Tabs may be mounted on the guides to designate key signatures, and pins may be installed on the black keys to indicate the sharping and flatting of notes.

What I claim and desire to secure by Letters Patent is:

A keyboard and staff reader comprising a frame including a board bearing representations of a piano keyboard and a musical staff, guides supported by the frame running from lines and spaces of the staff into corresponding keys of the keyboard, means spacing the guides from the keyboard, and markers selectively movable along the guides over the keyboard.

In testimony whereof I affix my signature.

ETHEL LEE BUXTON.